United States Patent
Sommerlund et al.

(10) Patent No.: US 7,922,948 B2
(45) Date of Patent: Apr. 12, 2011

(54) METHOD OF MOULDING SOLES ON SHOE UPPERS, A SHOE WELT AND A MOULD FOR CARRYING OUT THE METHOD

(75) Inventors: Jens Erik Sommerlund, Bredebro (DK); Hans Christian Hansen, Løgumkloster (DK)

(73) Assignee: ECCO Sko A/S (DK)

( * ) Notice: Subject to any disclaimer, the term of this patent is extended or adjusted under 35 U.S.C. 154(b) by 1385 days.

(21) Appl. No.: 10/506,916

(22) PCT Filed: Mar. 4, 2003

(86) PCT No.: PCT/DK03/00133
§ 371 (c)(1),
(2), (4) Date: Sep. 3, 2004

(87) PCT Pub. No.: WO03/074261
PCT Pub. Date: Sep. 12, 2003

(65) Prior Publication Data
US 2005/0116383 A1    Jun. 2, 2005

(30) Foreign Application Priority Data

Mar. 4, 2002  (DK) ................................ 2002 00329

(51) Int. Cl.
*B29D 99/00* (2010.01)
(52) U.S. Cl. ...................................................... 264/244
(58) Field of Classification Search .................. 264/244; 425/119, 124, 383; 12/4.1, 4.2, 14.3, 33.4, 12/48, 67.1, 67, 67.2; 36/87, 78; 106/38, 106/242.8
See application file for complete search history.

(56) References Cited

U.S. PATENT DOCUMENTS

| 853,160 | A |   | 5/1907 | Cass |
|---|---|---|---|---|
| 1,530,297 | A | * | 3/1925 | Byrne ........................... 36/22 R |
| 2,062,339 | A |   | 12/1936 | Vizard |

(Continued)

FOREIGN PATENT DOCUMENTS

| FR | 1073710 | 9/1954 |
|---|---|---|
| FR | 2609874 | 1/1987 |

(Continued)

*Primary Examiner* — Christina Johnson
*Assistant Examiner* — Larry Thrower

(57) ABSTRACT

In a method of moulding a sole of a plastic material and a welt on a shoe upper (1) a mould (3) is used. The mould (3) includes at last (2), upon which a shoe upper (1) is arranged, an upper mould part (5) divided along a longitudinal middle plane and thus includes two halves (5a, 5b) being laterally movable in relation to the lower mould part (4) between an open and a closed mould position, and a lower mould part (4) being vertically movable in relation to the upper mould part (5) between an open and a closed mould position. For carrying out the method an annular shoe welt (6) is provided and arranged in the mould in the mould's open position. The two halves (5a, 5b) of the upper mould part (5) are closed and the lower mould part is moved into its closed position. As a result a circumferential support surface (7) on the upper face of the lower mould part (4) co-acts with a pressure surface (17) on the lower face of a projection (15) on each half (5a, 5b) of the upper mould part such that the portion of the welt (6) facing the shoe upper (1) it tilted inwards and downwards to bring the inner end face of the welt (6) into sealing engagement with the lower side section of the shoe upper (1). The shoe sole is then moulded in a manner known per se by supplying a plastic material to the cavity of the mould.

22 Claims, 5 Drawing Sheets

U.S. PATENT DOCUMENTS

| | | |
|---|---|---|
| 2,161,902 A | 6/1939 | Riley |
| 3,042,975 A | 7/1962 | Bingham, Jr. et al. |
| 3,855,657 A | 12/1974 | Mazzotta |
| 3,965,517 A * | 6/1976 | Auberry et al. ............ 12/142 RS |
| 4,651,444 A * | 3/1987 | Ours .................................. 36/93 |
| 5,032,330 A * | 7/1991 | Auberry et al. ................ 264/244 |
| 5,247,741 A | 9/1993 | Pastor |

FOREIGN PATENT DOCUMENTS

| | | |
|---|---|---|
| GB | 653106 | 5/1951 |
| GB | 840029 | 7/1960 |
| GB | 1258966 | 1/1972 |
| GB | 1375159 | 11/1974 |
| GB | 1594232 | 6/1981 |
| WO | WO 8444444 | 11/1984 |

* cited by examiner

METHOD OF MOULDING SOLES ON SHOE UPPERS, A SHOE WELT AND A MOULD FOR CARRYING OUT THE METHOD

TECHNICAL FIELD

The invention relates to a method of moulding soles of a plastic material, eg polyurethane, and shoe welts on shoe uppers by means of a mould so as to provide the finished shoe with a welted appearance, said mould including a last, upon which a shoe upper is arranged, an upper mould part being divided along a longitudinal centre plane and thus including two halves being laterally movable in relation a lower mould part between an open and a closed mould position, and a lower mould part being vertically movable in relation to the upper mould part between an open and a closed mould position.

BACKGROUND ART

French publication No. 2609874 discloses a method of producing a shoe in which a welt is moulded onto the shoe to give the shoe the appearance of a welted shoe. The welt is arranged vertically and the sole material joining the welt and the shoe upper is thus visible between the shoe upper and the welt, which is not satisfactory.

U.S. Pat. No. 3,855,657 discloses a method of the above type of moulding a foxing, which is not an actual welt, onto the side of a shoe sole. In this method a two-part foxing formed of two halves is used. In the open mould position a foxing half is arranged in a groove in each of the two halves of the upper mould members. The grooves are open in the radially inward direction. The mould is then closed and the shoe sole is moulded in the cavity defined thereby. During the moulding process moulding material in introduced between the shoe upper and the foxing so as to fix the latter to the shoe sole and thus to the shoe upper.

GB 840,029 discloses a method of the above type of simultaneous moulding of a welt and a sole onto a shoe upper. In this method a two-part welt is used, each welt half substantially corresponding to half of the welt on the finished shoe. In the open mould position, one half of the welt is inserted into a groove in the inner surface of each upper mould member. Adjacent the groove, each of the upper mould members is provided with a protection to support the welt during the moulding process. The mould halves are then closed around the shoe upper arranged on a last, whereby the welts are made to abut the lower face of the shoe upper. Moulding material is subsequently poured into the cavity formed by the shoe upper and the upper mould member, a piston then being inserted into the cavity and the sole is formed and moulded onto the shoe upper. The use of a two-part welt involves a risk of the sole material flowing in between the welts and the shoe upper at the ends of the welt halves at the heel and toe sections of the shoe. It is furthermore time-consuming to arrange one welt half in each of the halves of the upper mould member.

DESCRIPTION OF THE INVENTION

The object of the invention is to provide a method of the above type allowing for a comparatively simple and reliable fitting of a welt without causing the sole material to flow in between the shoe welt and the shoe upper such that it becomes visible on the finished shoe.

The method according to the invention is characterised in that:

A—an annular welt is provided having an inner outline substantially corresponding to the outer outline of the lower side section of the shoe upper which corresponds to the position of the welt on the finished shoe, B—the welt is placed in the mould in the open position of the mould, C—the two halves of the upper mould part are brought together, whereby an upper projection on each half extends over the shoe welt, D—the lower mould part is moved into its closed position, a circumferential support face on the upper face of the lower mould part co-acting with a pressure surface on the lower face of the projection on each of the upper mould halves in such a manner that the portion of the welt facing the shoe upper is tilted inwards and downwards to bring the inner end face of the welt into sealing engagement with the lower side section of the shoe upper, and E—the shoe sole is moulded in a manner known per se by supplying a plastic material to the cavity of the mould.

When the upper mould halves of the mould have been closed around the shoe upper, (ie the halves have been brought together), and the upper and the lower mould parts are being brought together, (ie moved into their closed position), a portion of the shoe welt tilts about the upper edge of the circumferential support surface and is made to engage the side section of the shoe upper along the entire periphery thereof. As a result, the plastic material (eg polyurethane) is prevented from flowing out between the shoe welt and the shoe upper. Secure adherence of the welt to the shoe upper has, however, been effected. It has also been found that the method according to the invention is applicable to many shoe designs.

After moulding of the sole, the mould parts are separated and the shoe is taken out of the mould. The outermost portion of the welt is then trimmed and suitably processed to provide the shoe with its finished look.

According to the invention the inner end face of the welt facing the shoe upper may be provided with a substantially vertical surface preferably being provided with an undercut. As a result a reliable attachment is obtained by means of the vertical end face, while the undercut ensures that plastic material flows in between the welt and the upper for a reliable attachment of the welt.

Furthermore, according to the invention the upper mould halves and/or the lower mould part may exert such a pressure on the welt that it is caused to tilt and the inner end face thereof is pressed against the shoe upper such that at least the uppermost 10% of the said end face sealingly abuts the shoe upper. A very reliable attachment of the welt to the moulded sole and to the shoe upper is thus obtained.

Moreover according to the invention the support surface may be a face of a circumferential recess in the upper face of the lower mould part, in a cross-sectional view said face forming an angle v of 20-40°, preferably 25-35°, with the horizontal plane. As a result when moved into their closed position the upper mould and lower mould parts interact particularly effectively to tilt the welt about the radially innermost edge of the recess, whereby the welt is more accurately positioned in relation to the shoe upper at the same time as the shoe upper may be subjected to a radially inward force by the outer inclined surface of the recess.

According to the invention, prior to being placed in the mould, the welt may be attached along the edge of a relatively thin auxiliary sole, which is pervious to the plastic material and assists retaining the welt about the shoe upper. This method has proved to be particularly advantageous.

According to the invention the auxiliary sole may particularly advantageously be made of a pervious fabric, eg. pressed plastic fibres or an adhesive-treated fabric provided with a plurality of perforations, the diameter of the perforations preferably being 1.5-6 mm and the spacing between the perforations preferably being 3-16 mm.

Furthermore, according to the invention the auxiliary sole may advantageously be made of a plastic fibre mesh.

According to the invention the welt may be made of a comparatively soft material such as leather, rubber, plastics or compressed leather-fibres (lefa), which has proved particularly advantageous.

Moreover, according to the invention the welt may be arranged on the circumferential support surface on the upper face of the lower mould part in the open position of the mould.

Furthermore according to the invention the welt may be attached to the lower face of the shoe upper via the auxiliary sole, preferably by means of an adhesive and/or by means of centring pins and made to engage the support surface or the recess in the lower mould part during the movement of the lower mould part into its closed position. It is thus ensured that the welt adopts the correct position in relation to the shoe upper before the shoe sole is moulded.

The invention also relates to a welt for use in the method according to the invention. The shoe welt is characterised in that it is substantially annular and provided with an inner outline substantially corresponding to the outer outline of the lower side section of the shoe upper at the position of the shoe welt on the finished shoe and that the surface, which is to face the shoe upper, is substantially vertical and optionally provided with an undercut at least on its lowermost portion. As a result in a particularly advantageous manner the welt adheres strongly to shoe upper allowing the shoe sole material to flow into a "wedge" between the face of the welt facing the upper and the shoe upper, while preventing the shoe sole material from flowing out above the welt (on the finished shoe).

On its outer face the welt may be provided with a number of preferably equidistant incisions.

According to the invention the welt may be attached along the edge of a supporting auxiliary sole by means of adhesion and/or sewing, said auxiliary sole having an outline substantially corresponding to that of a finished moulded sole. It is thus possible to accurately position the welt in relation to the upper, and the finished shoe will greatly resemble an actually welted shoe, when the upper face of the welt is provided with a mock seam to represent a welt.

Furthermore according to the invention the welt may have a cross-sectional shape substantially corresponding to a trapezium, a rectangle or a rectangle with a short auxiliary lip. In practice these cross-sectional shapes have proved particularly suitable.

The invention further relates to a mould for carrying out the method according to the invention, said mould including a lower mould part and an upper mould part divided in the longitudinal direction, the two halves thereof being laterally movable relative to the lower mould part between an open and a closed mould position and the lower mould part being vertically movable relative to the upper mould part between an open and a closed mould position, said mould further including a last with a shoe upper thereon and arranged above the lower mould part, each of the upper mould halves provided being with a projection. The mould is characterised in that it has a circumferential support surface formed on the upper face of the lower mould part and optionally is formed in a circumferential recess in said upper face, said support face acting to support a welt and preferably upwardly inclining towards the lower portion of the shoe upper, and that projection on the lower face of each upper mould part half has a pressure surface for deforming at least a portion of the welt when the upper mould part and the lower mould part are made to engage, and a retaining surface for retaining the welt. This mould has proved particularly suitable for carrying out the method according to the invention.

According to the invention the circumferential recess may have a substantially V-shaped cross-section at the top of which the support surface continues into a horizontal top surface for supporting the radially innermost portion of the welt during the moulding of the shoe sole onto the shoe upper, said support surface forming an angle v of 20-40°, preferably 25-25°, with the horizontal plane. By providing a support surface with such an incline, a particularly reliable and correct forming of the welt is obtained in connection with the moulding of the shoe sole.

Moreover, according to the invention the width of the projection on each upper mould half may be selected such to allow the edge of the projection facing the upper to extend beyond the side wall of the lower mould part in the closed position of the upper and lower mould parts, and to prevent an excessive exertion of pressure on the shoe upper. As a result when carrying out the method according to the invention the mould does not leave pressure marks on the shoe upper.

Furthermore, according to the invention at least a portion of the forming pressure surface and of the retaining surface, respectively, may be substantially parallel to the circumferential top face and the support surface, respectively, of the lower mould part. At the same time as the shoe sole is moulded, the upper face of the welt is thus provided with a particularly pleasing shape which contributes to giving the finished shoe a highly attractive appearance.

When at least one supply conduit for supplying fluid moulding material, eg PU, to the mould cavity is provided in the upper mould part, preferably in its heel section and preferably at the joint face between the two upper mould halves, the supply conduit may be divided into two smaller conduits shortly before it opens into the mould cavity so as to form a Y-shaped conduit, the inlet openings of the two conduits to the mould cavity being at different levels. A portion of the sole moulding material is thus supplied to the front portion of the mould cavity, when ejected into the mould cavity, while another portion of the sole moulding material is supplied to the rear-most portion of the mould cavity. As a result the tendency to form voids in the sole is minimised.

Moreover, one of the branch conduits may be adapted to eject a jet of sole moulding material towards the shoe upper at an upwardly inclined angle y relative to the horizontal direction, where 50°<y<80°, while the other branch conduit may be adapted to eject a jet of moulding material downwards towards the bottom of the mould cavity at an angle z relative to the horizontal direction, where 50°<z<80°.

Furthermore the mould may be adapted to work with polyurethane having a temperature of 85-150° C. during the moulding process, the upper mould and the lower mould parts being brought together by means of a compressive force of 0.4-4 t, preferably 1.8 t, whereby the finished sole is provided with a particularly pleasing appearance without voids.

The "stem" conduit in the Y may have a diameter of 5-10 mm and each branch conduit may have a diameter of 3-6 mm. This mould has proved particularly suitable for moulding of sole of polyurethane.

Finally, the mould may be made from aluminium, whereby a particularly simple manufacture of the mould is obtained.

BRIEF DESCRIPTION OF THE DRAWINGS

The invention is explained in greater detail below with reference to the accompanying drawings, in which.

BEST MODES FOR CARRYING OUT THE INVENTION

Figure 1:
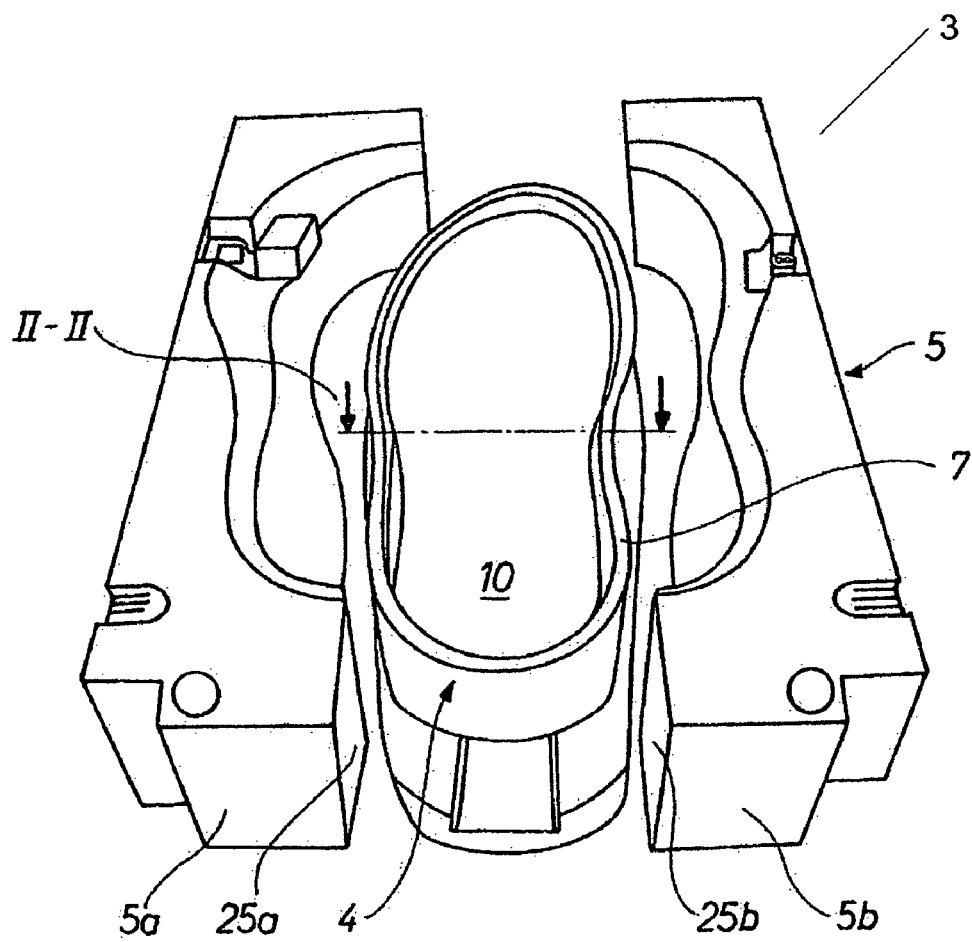
FIG. 1 is a perspective view of a mould for carrying out the invention, said mould shown in its open state and without a last and shoe upper.
Figure 4:
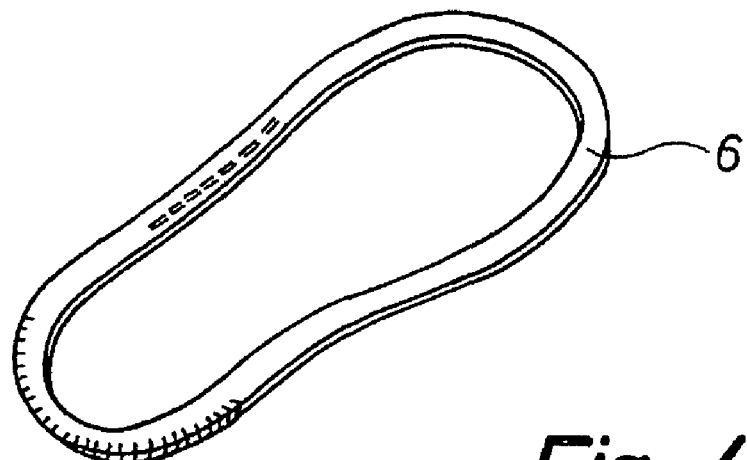
FIG. 4 is an inclined top view of a welt for use in the method according to the invention.
Figure 5:
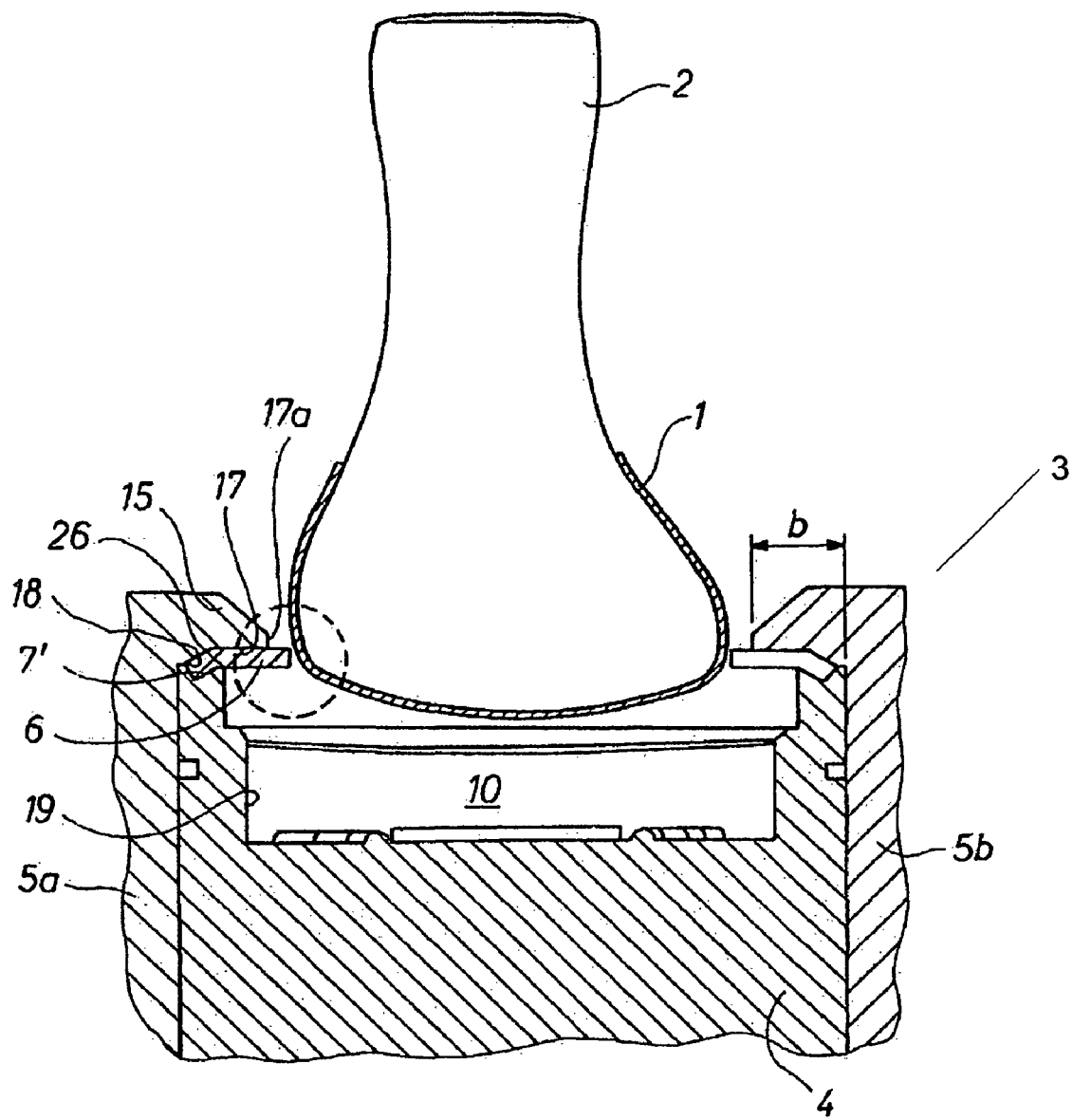
FIG. 5 is a sectional view of a portion of the upper mould part, the lower mould part and a last with a shoe upper arranged thereon during moulding of the sole.

FIG. 1 illustrates a mould by means of which a method of moulding soles of a plastic material, eg. polyurethane, onto shoe uppers, may be carried out, a shoe upper 1 being arranged on a last 2, confer FIG. 5. As shown in FIG. 1 the mould 3 has a lower mould part 4 and an upper mould part 5 with two upper mould halves 5a, 5b. These upper mould halves may be moved to and fro each other in a horizontal plane. When the mould is used for the said method, the finished shoe will appear to have been actually welted. A welt 6 is used in the method, confer FIG. 4. The welt is annular and has an outline substantially corresponding to the circumference of the finished shoe in lower section of the shoe upper.

In a first embodiment of the method according to the invention, for moulding a shoe sole onto the shoe upper 1 the welt 6 is initially arranged on a circumferential support surface 7 on the lower mould part. In FIG. 3 the cross-section of the welt is indicated by means of a dotted line at the reference numeral 6 and it is apparent the welt 6 inclines downwards from its inner end face 6a towards its outer end face. Instead of being arranged on the support surface 7, the welt may be arranged in a circumferential recess 21 in the upper face of the lower mould part, confer FIG. 2. After the shoe upper 1 (with the associated last) has been inserted into the mould, the welt 6 circumscribes the shoe upper and inclines upwards towards the lower portion of the shoe upper 1.

In the next step in the method, the two halves 5a, 5b of the upper mould part are closed around the shoe last 2 and the sole material is supplied to the cavity 10 in the upper lower mould part, which is to form the sole, said cavity also being defined by the shoe upper. The lower mould part with the shoe welt thereon is then moved towards the shoe upper and the joined halves of the upper mould part. At the same time, the welt is formed by means of a projection 15 on each of the upper mould halves 5a, 5b. A small amount of the sole material flows in between the end face 6a of the welt and the lower portion of the shoe upper to ensure that the welt adheres strongly to the shoe upper. FIG. 5 illustrates the mould in its closed position with the shoe upper (on the last 2) inserted into the mould. It is also shown how the circumferential projection 15 of the upper mould part has moved the portion of the welt 6 extending into the mould cavity 10 downwards in horizontal direction such that a bending (or rather bending (or rather a tilting) of the portion of the welt extending into the mould cavity has taken place.

Figure 6:
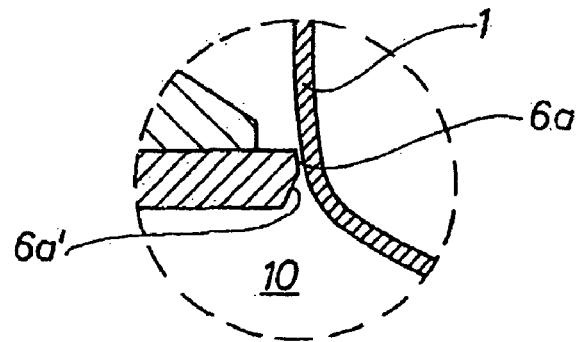
FIG. 6 is a view of the details shown in the small circle in FIG. 5 on a larger scale.

The halves 5a, 5b of the upper mould part 5 and/or the lower mould part 4 exert(s) such a pressure on the welt 6 that it is caused to tilt (or bend), whereby the vertical end face 6a of the welt closely abuts the shoe upper 1, at least 10% of the end face 6a tightly sealing against the shoe upper. As shown in FIG. 6, a portion of the end face 6a may be provided with a slight undercut 6a'.

Figure 2:
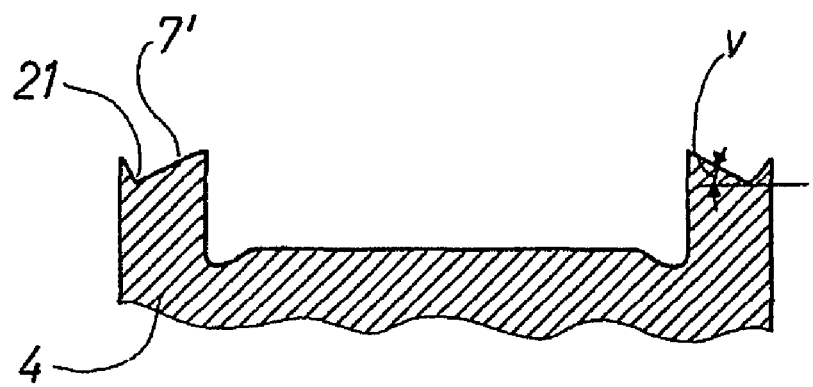
FIG. 2 is a sectional view of the lower mould part along the line II-II in FIG. 1.
Figure 3:
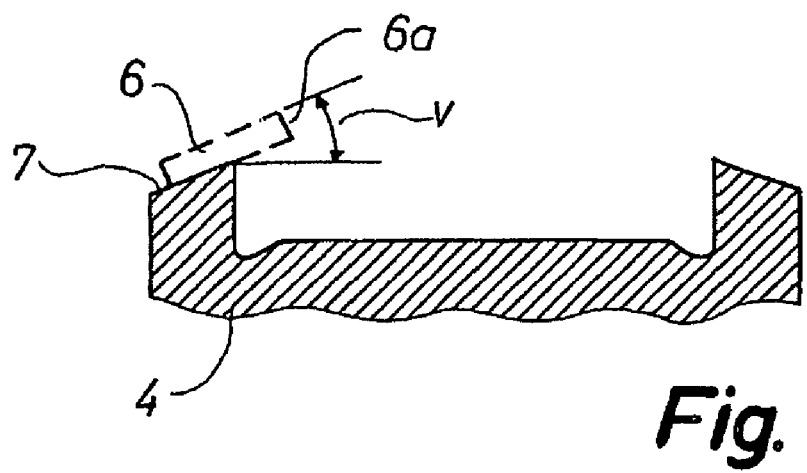
FIG. 3 is a sectional view as in FIG. 2, but showing another embodiment of the lower mould part.

As shown in FIG. 2 the support surface 7' in the circumferential recess 21 of the used lower mould part 4 forms an angle v of 20-40°, preferably of 25-35°, with the horizontal plane in a cross-sectional view. In the present case the angle v is about 30°.

The seal between the end face 6a of the welt and the shoe upper 1 appear clearly from FIG. 6. It should be noted that even though the end face 6a of the welt is shown spaced apart from the shoe upper in FIGS. 5 and 6, as described above the end face 6a sealingly engages the shoe upper in practice.

The show welt may be made of a comparatively soft material such as leather, rubber, plastics or compressed leather-fibres (lefa).

Figure 7:
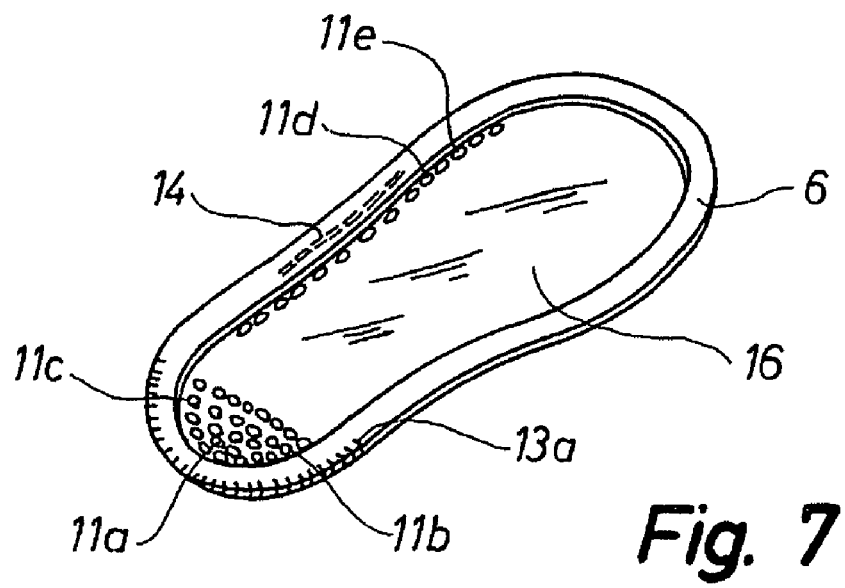
FIG. 7 is a perspective top view of a welt attached to an auxiliary sole.
Figure 8:
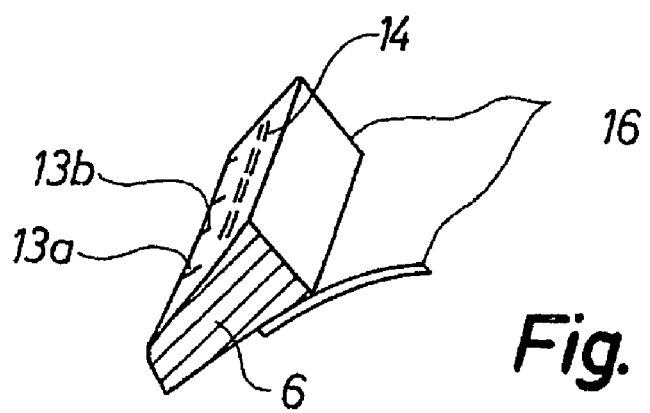
FIG. 8 is a view of a small section of an embodiment of a welt according to the invention, a small portion of the auxiliary sole also being visible.

As shown in FIGS. 7 and 8, prior to being arranged in the recess 21 of the lower mould part 4, the welt 6 may be mounted on a comparatively thin auxiliary sole 16, the welt being attached along the edge of the auxiliary sole. In connection with the attachment of the welt 6 to the auxiliary sole 16 it should be noted that the attachment may be effected by adhesion and/or sewing, and as illustrated the welt may be provided with a mock seam 14 to give the illusion of a welt, confer FIGS. 7 and 8. When arranged on the lower mould part 4 prior to the moulding process, the auxiliary sole 16 contributes to retaining the welt in place in relation to the support surfaces 7' (optionally the support surface 7) such that the welt is in its intended position on the finished shoe.

The auxiliary sole 16 may be made of a pervious fabric, eg. of pressed plastic fibres or of an adhesive-treated fabric with a plurality of perforations. The diameter of the perforation is preferably between 1.5 and 6 mm and the spacing between the perforations is preferably between 3 and 16 mm. For reasons of clarify the perforations 11a, 11b, 11c are shown excessively large in FIG. 8. Only some of the perforations are shown. In practice the entire auxiliary sole is provided with perforations. Optionally the perforations may be provided immediately adjacent the welt 6, confer the perforations 11d, 11e. The perforations serve to ensure that sole material may flow readily into the cavity between the auxiliary sole and the lower portion of the shoe upper during moulding. The auxiliary sole 16 may also be made of a plastic fibre mesh.

Instead of arranging the shoe welt (with or without the auxiliary sole) directly in the recess 21 prior to the moulding of the sole, according to a second embodiment of the invention, while arranged on the auxiliary sole the welt 6 may be attached to the lower face of the shoe upper by means of the auxiliary sole, preferably by means of adhesion and/or by attaching the auxiliary sole to the lower face of the shoe upper by means of centring pins (not shown) which are able to co-act with one or more of the perforations 11*a*, 11*b*, 11*c*, 11*d*, 11*e*.

As regards the moulding of the sole it should be noted that the moulding material, eg a PU foam material, may be supplied to the mould cavity 10 (confer FIG. 5) before the upper mould part 5 and the lower mould part 4 of the mould are brought together, eg by means of a compressive force of 0.4-4 t, preferably 1.8 t. Optionally the upper mould part 5 and the lower mould part 4 may be brought together before the moulding material, eg PVC, is supplied to the cavity 10.

As mentioned above, the welt 6, which is used for carrying out the method according to the invention, is substantially annular and has an outline substantially corresponding to that of the sole of the finished shoe. As shown in FIGS. 6 and 7 the surface 6*a*, which is to face the shoe upper 1, is substantially vertical. However, at least the lowermost portion thereof being provided with an undercut, confer the face 6*a*'. A number of preferably equidistant incisions 13*a*, 13*b*, 13*c*, which are typically spaced apart by 5 mm, may be provided in the welt's outer face facing away from the shoe upper.

Figure 9:
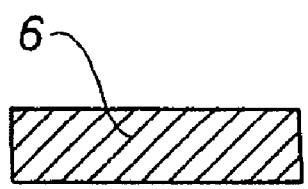
FIG. 9 is a sectional view of a second embodiment of the welt according to the invention.
Figure 10:
FIG. 10 is a sectional view of a third embodiment of the welt according to the invention.
Figure 11:
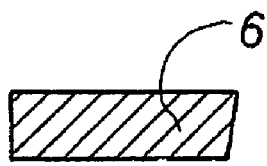
FIG. 11 is a sectional view of a fourth embodiment of the welt according to the invention.

As shown in FIG. 8 the welt may be trapezoidal or as shown in FIG. 9 rectangular, or as shown in FIG. 10 rectangular and provided with a short auxiliary lip 27.

A mould for carrying out the method according to the invention is described in details below. As mentioned above and as shown in FIGS. 1 and 5, the mould includes a lower mould part 4 and a upper mould part 5 which is divided in the longitudinal direction, the two halves 5*a*, 5*b* thereof being laterally movable in relation to the lower mould part 4. A last with a shoe upper arranged thereon may be arranged between the two halves of the upper mould part and above the lower mould part. As shown in FIGS. 5 and 6, each upper mould half 5*a*, 5*b* is provided with a projection 15 having a forming pressure surface 17 on its lower face.

As illustrated in FIGS. 2 and 3, on its upper face the lower mould part 4 is provided with a circumferential support surface 7, optionally a support surface 7' formed in a circumferential recess 21 in the lower mould part 4. This support surface is upwardly inclined towards the lower portion of the shoe 1 and acts to support and retain the welt in its correct position. The forming pressure surfaces 17 of the upper mould halves on the lower faces of the projections 15 define and form at least a portion of the welt 6 jointly with the support surfaces 7 when the upper mould part 5 and the lower mould part 4 are brought together. On their lower faces each projection 15 is further provided with a retaining surface 18 clamping the radially outermost portion of the welt 6 onto the lower mould part 4. The clamping action may also be effected by means of a narrow horizontal top face 26 on the upper face of the lower mould part. The top face 26 is arranged adjacent the supper surface 7'.

The circumferential recess 21 may have a substantially V-shaped cross section. The support surface 7' in the recess only supports the radially outermost portion of the welt 6 during the moulding of the shoe sole onto the shoe upper, and as mentioned above the support surface forms an angle v of 20-40°, preferably 25-35°, with the horizontal plane.

It should be noted as regards the width b of the projection 15 of the upper mould part 5 that the width is chosen so as to allow the edge face 17*a* of the projection 15 facing the shoe upper 1 to extend beyond the side wall 19 of the lower mould part (in the joined state of the mould parts), said edge face just clearing the shoe upper 1 such that the latter is not subjected to excessive pressure from the edge face 17*a*. A too tight engagement of the edge face 17*a* with the shoe upper would cause a circumferential pressure mark on the shoe upper, which degrades the appearance of the finished shoe. Such pressure markings are thus avoided by means of the present invention.

At least a portion of the pressure surface 17 of the upper mould part projection 15 may be substantially parallel to the circumferential support surface 7' of the lower mould part.

Fluid sole moulding material may be supplied to the mould cavity 10 of the mould in various ways, either prior to or after the upper mould part and the lower mould part have been brought together. By supplying the fluid moulding material, eg. polyurethane, before the upper and lower mould parts are brought together, the supply may be effected via the upper lower part 6, preferably in its heel section and preferably at the joint face between the two upper mould halves, a supply conduit 22 for instance being provided at the said joint face, confer FIG. 12. Shortly before opening into the cavity 10, the conduit is divided into two smaller conduits 22*a* and 22*b*, whereby the supply conduit becomes substantially Y-shaped. As shown, the orifices 22*a*' and 22*b*' of the branch conduits 22*a* and 22*b* facing the cavity are positioned at two different levels in the mould cavity 10.

Figure 12:
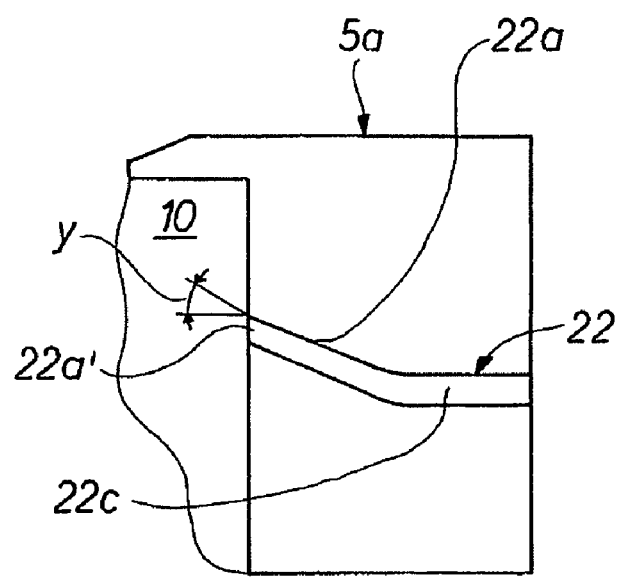
FIG. 12 shows a portion of the joint face of one of the upper mould halves, one branch of the Y-shaped supply conduit for the fluid sole moulding material being clearly visible.
Figure 13:
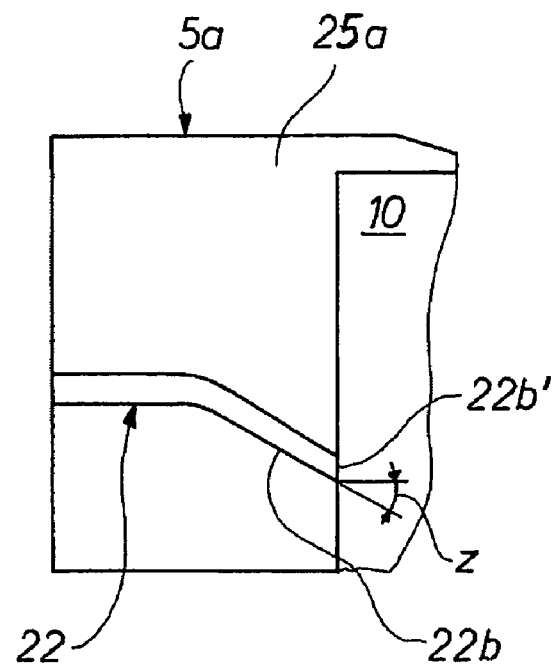
FIG. 13 shows a portion of the joint face of the other upper mould half, the other branch of the Y-shaped supply conduit being clearly visible.

As shown in FIGS. 12 and 13, during moulding the branch conduit 22*a* ejects a jet of moulding material in an upwardly inclined angle Y preferably of 40-80° in relation to the horizontal plane. The other branch conduit 22*b* ejects a jet of moulding material downwards towards the mould cavity at an angle z (measured in relation to the horizontal direction) of preferably 40-80°. The branch conduits may also be formed such that the two jets are not ejected into the middle plane of the mould, but form an angle with this plane being different from 0°. This feature is, however, not shown.

It should be noted as regards the dimensions of the supply conduit 22 that the supply conduit in the Y may have a diameter of 5-10 mm and that each branch conduit 22*a*, 22*b* may have a diameter of 3-6 mm.

When fluid moulding material is supplied to the mould cavity after the upper and lower mould parts have been brought together, the supply may for instance take place through a supply conduit extending through both the upper mould part and the lower mould part.

The invention claimed is:

1. A method for moulding soles of a plastic material, and shoe welts on shoe uppers by use of a mould so as to provide a finished shoe with a welted appearance, said mould including a last, upon which a shoe upper is arranged, an upper mould part divided along a longitudinal middle plane and thus including two halves being laterally movable in relation to a lower mould part between an open and a closed mould position, and a lower mould part being vertically movable in relation to the upper mould part between an open and a closed mould position, said method comprising:

A—an annular welt is provided having an inner outline substantially corresponding to an outer outline of the lower side section of the shoe upper which corresponds to the position of the welt on the finished shoe, said welt being attached along an edge of a relatively thin auxiliary sole which is pervious to the plastic material and assists in keeping the welt in place during the moulding of the sole, B—the welt attached to the auxiliary sole is placed in the mould in the open position of the mould, C—the two halves of the upper mould part are brought together, whereby an upper projection on each of the halves extends over the welt, D—the lower mould part is moved into its closed position by a vertical movement in relation to the upper mould part, a circumferential support face on an upper face of the lower mould part co-acting with a pressure surface on a lower face of the projection on each of the upper mould part halves in such a manner that a portion of the welt facing the shoe upper is tilted inwards and downwards to bring an inner end face of the welt into sealing engagement with a lower side section of the shoe upper and E—the shoe sole is moulded by supplying a plastic material to a cavity of the mould before or after the lower mould part is moved into its closed position.

2. Method according to claim 1, wherein the inner end face of the welt facing the shoe upper has a substantially planar surface.

3. Method according to claim 1, wherein pressure is exerted on the welt by the halves of the upper mould part and/or by the lower mould part that the welt is caused to tilt and the inner end face thereof is pressed against the shoe upper, so that at least the uppermost 10% of the end face sealingly abut the shoe upper.

4. Method according to claim 1, wherein the support surface is a face of a circumferential recess in the upper face of the lower mould part, in a cross-sectional view said face forming an angle v of 20-40° with horizontal plane.

5. Method according to claim 1, wherein the used auxiliary sole is made of a pervious fabric, with a plurality of perforations.

6. Method according to claim 1, wherein the welt is made of a comparatively soft material.

7. Method according to claim 1, wherein the welt is arranged on the circumferential support surface on the upper side of the lower mould part in the open position of the mould.

8. Method according to claim 1, wherein the welt is attached to a lower face of the shoe upper via the auxiliary sole, and brought into engagement with the support surface or received in a recess in the lower mould part during the movement of the lower mould part into its closed position.

9. Method according to claim 1, wherein the welt is substantially annular and provided with an inner outline substantially corresponding to the outer outline of the lower side section of the shoe upper at the position of the shoe welt on the finished shoe and that the surface, which is to face the shoe upper, is substantially vertical.

10. Method according to claim 9, wherein the welt is attached along the edge of an auxiliary sole by means of adhesion or sewing, said auxiliary sole having an outline substantially corresponding to that of a completed moulded sole.

11. Method according to claim 9, wherein a cross-sectional shape of the welt corresponds substantially to a trapezium, a rectangle or a rectangle with a short auxiliary lip.

12. Method according to claim 1, wherein said mould comprises:
a lower mould part and an upper mould part divided in the longitudinal direction, the two halves thereof being laterally movable relative to the lower mould part between an open and a closed mould position and the lower mould part being vertically movable relative to the upper mould part between an open and a closed mould position;
a last with an attached shoe upper arranged above the lower mould part, each half of the upper mould part being provided with a projection, wherein the mould has a circumferential support surface formed on the upper face of the lower mould part, said support face acting to support the welt and the projection on the lower face of each upper mould half has a forming pressure surface for deforming at least a portion of the welt during closure of the upper mould part and the lower mould part, and further provided with a retaining surface for retaining the welt.

13. Method according to claim 12 wherein the support surface formed on the upper face of the lower mould part is formed in a circumferential recess in said upper face.

14. Method according to claim 12 wherein the width (b) of the projection on each upper mould part half has been chosen such that when the mould parts are closed, the edge of the projection facing the shoe upper extends beyond the side wall of the lower mould part, but prevents an excessive exertion of pressure on the shoe upper.

15. Method according to claim 11, wherein at least a portion of the forming pressure surface and of the retaining surface of the upper mould part projection is substantially parallel to the circumferential top face and the support surface, respectively, of the lower mould part.

16. Method according to claim 2, wherein the substantially planar surface is preferably provided with an undercut.

17. Method according to claim 4 wherein said face forms an angle v of 25-35° with a horizontal plane.

18. Method according to claim 6 wherein the welt is made as leather, rubber, plastics or compressed leather fibres (lefa).

19. Method according to claim 13, wherein the circumferential recess has a substantially V-shaped cross-section and at the top the support surface continues into a horizontal top surface for supporting the radially innermost portion of the welt during the moulding of the shoe sole on to the shoe upper, and the support surface forms an angle v of 20-40°, with the horizontal plane.

20. Method according to claim 12 wherein the support surface acting to support the welt is upwards inclining towards the lower portion of the shoe upper.

21. Method according to claim 19 wherein the support surface forms an angle V of 25-35° with horizontal plane.

22. Method according to claim 5, wherein the diameter of the perforation is 1.5-6 mm and the spacing between perforations is 3-16 mm.

* * * * *